United States Patent [19]
De Haan et al.

[11] Patent Number: 5,745,641
[45] Date of Patent: Apr. 28, 1998

[54] FULL-MOTION VIDEO DISC WITH REFERENCE INFORMATION FOR SLOW-MOTION OR FREEZE PLAYBACK

[75] Inventors: Wiebe De Haan; Jan Van Der Meer, both of Eindhoven, Netherlands

[73] Assignee: U.S. Philips Corporation, New York, N.Y.

[21] Appl. No.: 563,799

[22] Filed: Nov. 28, 1995

Related U.S. Application Data

[62] Division of Ser. No. 269,941, Jun. 28, 1994, which is a continuation of Ser. No. 707,527, May 30, 1991, abandoned.

[30] Foreign Application Priority Data

Jun. 5, 1990 [GB] United Kingdom ............... 9012538
Aug. 6, 1990 [NL] Netherlands ............... 9001771

[51] Int. Cl.⁶ .................................................. H04N 5/781
[52] U.S. Cl. ........................... 386/95; 386/109; 386/126
[58] Field of Search .......................... 358/335, 342, 358/310; 360/32, 48; 386/27, 33, 40, 45, 95, 109, 111–112, 124–126; H04N 5/76, 5/78, 5/92, 9/79

[56] References Cited

U.S. PATENT DOCUMENTS 5,371,602  12/1994  Tsuboi et al. ............... 358/335

*Primary Examiner*—Thai Tran
*Attorney, Agent, or Firm*—David R. Treacy

[57] ABSTRACT

An optically readable disc like a compact disc contains a sequence of full-motion video scene digital video blocks, having differing lengths. Each video block contains the entire encoded picture information for at least one picture of the sequence. A header in each video block contains reference information referring to the location of a predetermined video block in the series of blocks, so that this information permits a playback device to recover from a slow-motion or freeze mode by reading from a desired location in the predetermined video block.

9 Claims, 3 Drawing Sheets

1

FULL-MOTION VIDEO DISC WITH REFERENCE INFORMATION FOR SLOW-MOTION OR FREEZE PLAYBACK

This is a division of application Ser. No. 08/269,941, filed Jun. 28, 1994 which is a continuation of Ser. No. 07/707,527 filed May 30, 1991, now abandoned.

FIELD OF THE INVENTION

The invention generally relates to a method of transmitting a finite sequence of pictures of a full-motion video scene in a digital format via some transmission medium. More particularly, the transmission medium is constituted by a compact disc-like medium.

The invention also relates to a display device in which the pictures thus transmitted are processed and made suitable for display on a display screen, as well as to an optically readable medium on which said pictures are stored.

DESCRIPTION OF THE PRIOR ART

More than fifteen years ago the firm of Philips marketed an optically readable disc on which not only audio signals but also analog video signals were recorded. This disc was referred to as video long-play (VLP) and it supplemented the well-known audio long-play (ALP). As compared with video tapes, such optically readable discs have the advantage that their quality does not deteriorate due to repeated use. However, as compared with video tapes they have the drawback that they are not re-recordable.

In the last ten years there has been a completely new trend, namely that of the optically readable audio discs generally known under the name of CD audio (Compact Disc audio). Due to its general acceptance and the ever increasing demand for integration of audio and video apparatuses, a compact disc video has been created on which not only digitized audio signals but also an analog video signal is recorded which corresponds to a full-motion video scene of several minutes' duration.

To be able to extend the duration of such a video scene, the analog video signal is digitized. A full-motion video scene is then considered as a finite sequence of pictures of which, for example, twenty-five or thirty occur each second. Such a picture comprises, for example, 288 picture lines with 352 pixels for each line. With the aid of some suitably chosen encoding algorithm the sequence of pictures is converted into a series of video blocks each of which comprises such an amount of digital information that each pixel of a picture or of a predetermined number of pictures can be reconstructed. The most efficient encoding methods convert the picture sequence into a series of video blocks of different lengths (i.e. distinct numbers of bits). Consequently, the start of a new video block is not predictable. It is particularly this fact and the fact that the disc rotates at a predetermined constant speed which make features such as slow motion and freezes not very well possible. If it is assumed that the user freezes a picture for one minute while the disc continues its normal rotation, 25×60=1500 pictures will not be displayed during this minute when the normal display of the sequence takes place at a picture frequency of, for example, 25 pictures per second. Thus, this causes a discontinuity in the display of the picture sequence.

SUMMARY OF THE INVENTION

It is an object of the invention to contribute to the above-mentioned novel development by obviating the above-mentioned drawback.

According to the invention a header is added to each video block, said header comprising reference information referring to a predetermined video block in the series of video blocks.

This predetermined video block may be the actual video block but also the next video block in the series. The reference information may represent, for example, the ordinal number of said video block in the series.

With the use of the measure according to the invention a display device can be adapted to read a video block including its header added thereto, to separate the header from the actual picture information and to store it in an allocated memory location in a memory. The actual picture information is applied to a decoding circuit which determined the Y, U and V or R, G and B values for each pixel of a picture to be displayed and temporarily stores them in a picture memory. Whenever the picture stored in this picture memory must be displayed, it is read line by line and location after location. In the case of normal display of a picture sequence, the contents of the picture memory are refreshed, for example, every 1/25th second. In the case of slow motion this picture memory is, however, is refreshed, for example only five times a second, whereas in the case of a freeze the picture memory is not refreshed until after the normal display of the picture sequence has to be continued again. Whenever the contents of the picture memory are to be refreshed, the reference information associated with the picture currently stored in the picture memory is read and the video block to which reference is made is searched on the medium, read, processed and displayed as a picture. Since the indicated video block is the actual or the next video block in the series, the display of the picture sequence is each time continued without any discontinuity.

Since it takes some time to process the information read from the disc and since the video blocks occur at irregular instants due to their different lengths, it is advantageous to use a time code as reference information which is a measure of the instant when the relevant picture must be displayed relatively to a reference instant in the case of normal display of the picture sequence. This time code comprises an indication in hours, minutes and seconds, but also an auxiliary ordinal number n mod fr indicating the ordinal number of a picture in a series of pictures to be displayed within the period of a specific second. More particularly, n refers to the previously mentioned ordinal number of the video block and fr refers to the frame frequency.

As is generally known, the display device comprises a drive circuit for driving the read apparatus reading the information from the medium. This drive circuit can drive the read apparatus in such a way that it will exactly take that position which corresponds to said time code. However, since the video blocks have different lengths, this position will in general not correspond to the position of the video block comprising the picture information of the desired picture. In other words, when during slow motion or after a freeze the read apparatus is exactly positioned again in accordance with the time code, there will still be a discontinuity in the picture display. To avoid this, the reference information not only comprises a time code characterizing a location on the medium, but also a pointer code pointing at the location where the beginning of the video block of the desired picture can be found. More particularly, this pointer code represents the difference in location between the location of the beginning of the relevant video block on the medium and the location characterized by the time code.

DESCRIPTION OF THE PREFERRED EMBODIMENTS

Figure 1:
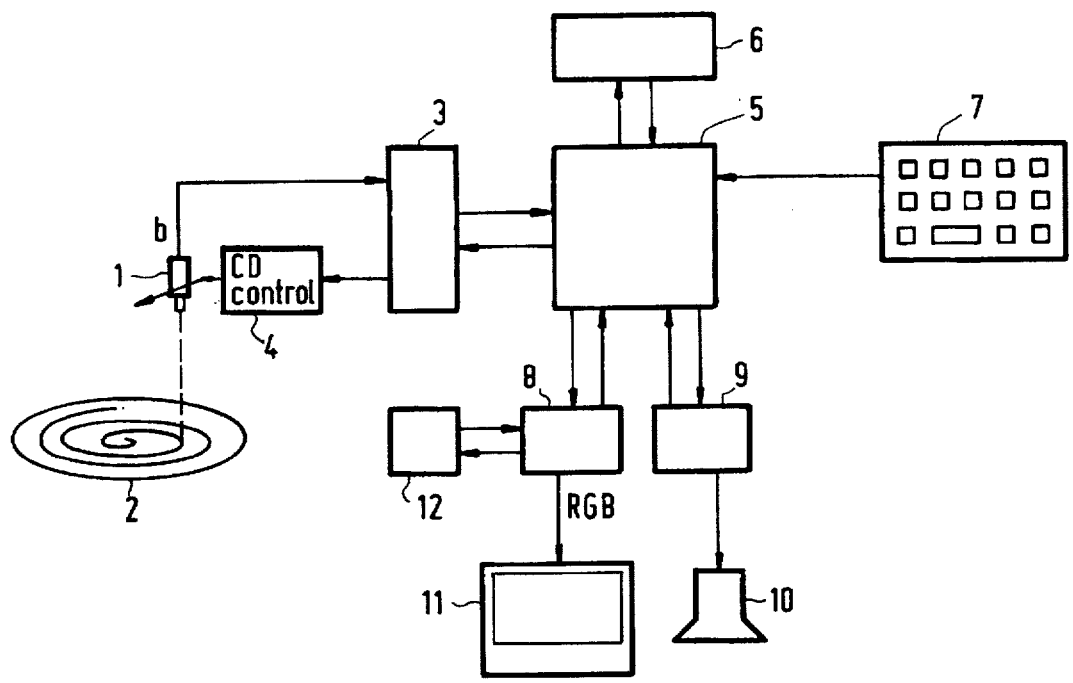
FIG. 1 shows diagrammatically the general structure of a display device for video pictures stored in a digital form on a compact disc-like medium.

FIG. 1 shows diagrammatically the general structure of a display device adapted to receive digitized pictures of a full-motion video scene which are transmitted by means of a compact disc-like medium (hereinafter referred to as disc). This display device has a read apparatus 1 by means of which information present on the disc 2 can be read and converted into a data current b. This data current is applied to an interface circuit 3 which in its turn applies signals to a CD drive unit 4 controlling the movement of the read apparatus 1 with respect to the disc 2. The interface circuit 3 is further connected to a central processor unit 5 having an internal memory in which the conventional system software is stored to realise the base drive of the display device. This central processor unit 5 receives the data current b via the interface circuit 3 and possibly applies drive commands for the CD drive unit 4 to the interface circuit 3. An auxiliary processor 6 may be connected to the central processor unit 5 via a two-way communication channel in which, for example, specific software present on the disc can be processed; the so-called application software. In order to enable a user to influence the operation of the display device, the central processor unit 5 also has a unit for user's commands connected to it, for example, a keyboard 7.

For displaying the different information signals, a full-motion video decoder 8 and an audio processor 9 are connected to the central processor unit 5 via a two-way information channel. Audio processor 9 processes the digital audio signals on the disc and applies them in an analog form to a loudspeaker 10. The full-motion video decoder processes the digital video signals on the disc and applies them in an analog form, for example, as primary colour signals R, G and B to a monitor 11. As a means for the display of the digital video signals, a picture memory 12 is connected to the full-motion video decoder, in which memory a digital R, G and B value may be stored after each pixel has been decoded, which values are converted into analog signals, when the memory is being read, and applied to the monitor 11.

Figure 2A:
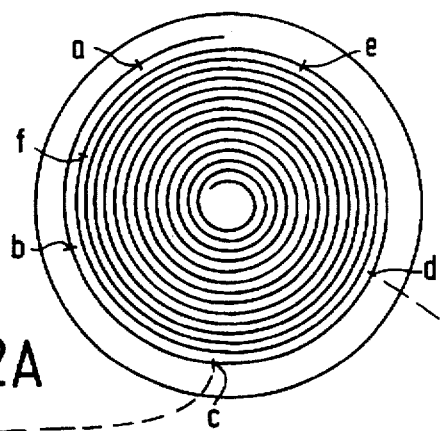
FIG. 2 shows diagrammatically a compact disc-like medium having a track with a sectoral division.
Figure 2B:
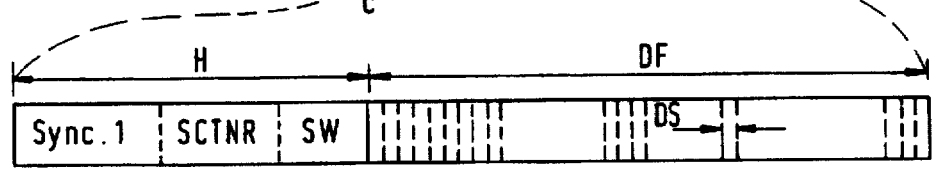
Figure 2C:
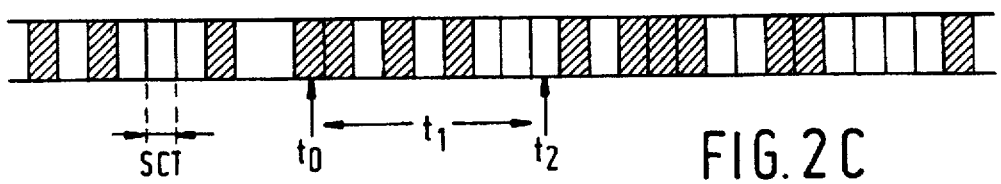

FIG. 2 shows diagrammatically at A a part of the track of a compact disc-like transmission medium. A so-called sector, of which there may be approximately 300,000, is present between two consecutive points a, b, c, d, e and so forth. The structure of such a sector is shown diagrammatically at B in FIG. 2. It comprises, for example 2352 bytes and is divided into a sector header H comprising 24 bytes and a data field DF comprising 2328 bytes.

The sector header H comprises a synchronization word SYNC.1 of 12 bytes, a sector number SCTNR of four bytes and a service word SW of eight bytes. The synchronization word SYNC.1 marks the beginning of a sector and is recognized as such by the central processor unit 5. It comprises one byte consisting exclusively of 0-bits, followed by ten bytes consisting exclusively of 1-bits and finally again one byte consisting exclusively of 0-bits. The bytes of the sector number SCTNR indicate the ordinal number of the sector on the disc. This ordinal number is read by the central processor unit 5 and stored in an internal memory. The central processor unit 5 therefore exactly recognizes from which sector the last-received information originates. The service word SW indicates whether the sector is a video sector, an audio sector or a computer data sector. The central processor unit 5 applies the data field of a computer data sector to, for example, the auxiliary processor 6, the field of an audio sector to the audio processor 9 and the field of a video sector to the full-motion video decoder 8.

A part of the track of the disc is shown once more at C in FIG. 2 in which the sectors are now indicated as blocks SCT. More particularly, the video sectors are shaded. As has been attempted to express in the Figure, the video sectors and the other sectors (audio and computer data sectors) occur in an arbitrary sequence.

As is shown at B in FIG. 2, the data field DF of a sector is divided into data slots DS. Each data slot in an audio sector comprises, for example, a 16-bit audio word of a digital audio signal. Each data slot in a video data sector and in a computer data sector comprises one 8-bit video word of a digital video signal and one data byte (8-bit), respectively.

As stated in the foregoing, a video picture comprises, for example, 288 lines of 352 pixels each and may thus be considered as a matrix of pixels $P(i,k)$, where $i=1, 2, \ldots 288$ is the ordinal number of the line and $k=1, 2, \ldots 352$ is the ordinal number of the pixel on this line (column). The colour of a pixel is entirely determined by a luminance value $Y(i,k)$ and two colour difference values $U(i,k)$ and $V(i,k)$. If these three values with eight bits of each of these pixels were accurately encoded, approximately 130 video sectors would be required for one picture. Since the conventional rotational speed of the disc is such that 75 sectors pass the read apparatus every second, more than one second is required to obtain the information of all pixels of a picture.

Many encoding methods are known to reduce the number of bits per picture and hence the number of sectors required per picture without any deterioration of the picture quality. The most efficient encoding methods convert consecutive pictures of a picture sequence into video blocks having distinct numbers of bits.

Figure 3:
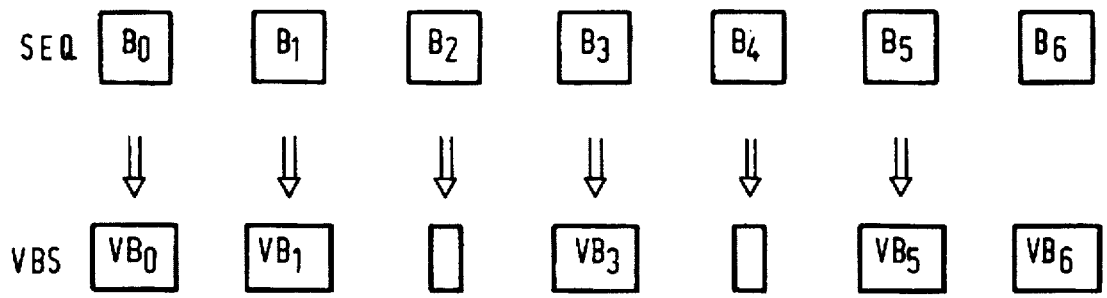
FIG. 3 shows in some diagrams different types of headers which can be associated with the video blocks.
Figure 3:
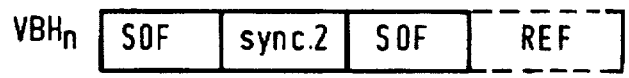
Figure 3:
Figure 3:
Figure 3:
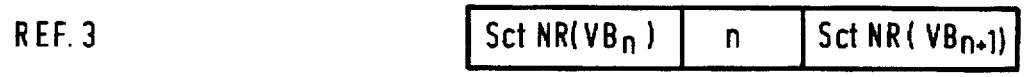
Figure 3:
Figure 3:
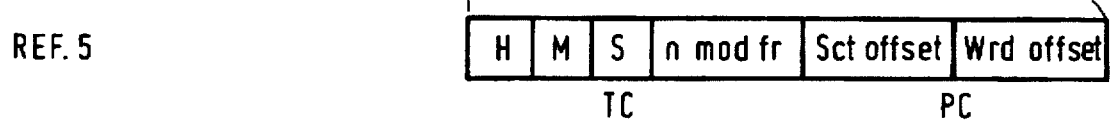

For the purpose of illustration FIG. 3 shows at SEQ a picture sequence comprising the pictures $B_0, B_1, B_2, \ldots B_6$ which jointly represent a full-motion video scene. By subjecting this picture sequence to some suitably chosen encoding method, picture $B_n$ is converted into a video block $VB_n$ ($n=0, 1, 2, \ldots 6$). It will be assumed that its bits occur serially. Distinct video blocks will generally have distinct lengths. The series of video blocks thus obtained is shown at VBS in FIG. 3.

To be able to distinguish the different video blocks, a block header is added to each of them. The block header which is added to the video block $VB_n$ is denoted by $VBH_n$ in FIG. 3. It comprises a Start of Frame code SOF followed by a synchronization word SYNC.2 which in its turn is followed by a further Start of Frame code SOF. More particularly, the hexadecimal code "C000" is chosen for the Start of Frame codes and the hexadecimal code "0002" is chosen for the synchronization word SYNC.2. The central processor unit 5 can distinguish the consecutive video blocks by means of these codes and can realise word synchronization so that the display of the picture sequence at a predetermined picture frequency is ensured in the case of normal use.

Since the disc rotates at a constant speed when the picture sequence is being displayed, features such as slow motion and freeze are not longer possible when the above-described transmission method is used, because in such cases the synchronization between reading the information of the disc, decoding this information and displaying the pictures represented by this information is lost. Let it be assumed that the user freezes a pictures for one minute. As from the instant when the normal display of the picture sequence is continued, 60×75=4500 sectors pass the read apparatus. Although the decoder 8 has a buffer for storing the data until the instant when their display is desired, the capacity of this buffer will be considerably smaller than is required for storing these 4500 sectors. This means that a part of the information which has been read is lost in the case of a freeze but also in the case of slow motion, which leads to discontinuity in the display of the picture sequence. To inhibit this and to be able to restore the necessary synchronization, the block header also includes a reference field REF which comprises reference information referring to a predetermined video block, for example, that of the actually displayed picture and/or that of the next picture in the picture sequence. The central processor unit 5 temporarily stores the contents of this reference field in a memory allocated for this purpose. These contents are preserved until a subsequent video block of the disc has been read and processed. After a slow motion or freeze feature has been switched off, the central processor unit 5 supplies drive commands to the CD drive unit 4, thereby moving the read apparatus 1 in such a way and for such a long time until the video block to which reference is made has been found.

This reference information can be composed in different manners. For example, as is indicated at REF.1 in FIG. 3, this reference information may comprise the ordinal number n of the actually displayed picture in the picture sequence. This means that when the display of the picture sequence after a freeze is resumed, the picture sequence is continued at this frozen picture. The central processor unit 5 may, however, also be programmed in such a way that it automatically adds one unit to this ordinal number n when the display of the picture sequence is resumed so that the CD drive unit 4 will search the video block with reference information n+1. It will be evident that in such a case it is preferable to take the ordinal number n+1 of the next picture as reference information.

If consecutive video blocks on the disc are enumerated in conformity with the series of natural numbers, the ordinal number n of each video block will have to be checked on conformity with the desired associated ordinal number when the desired video block is being searched. This results in a rather slow search procedure. Another possibility is shown diagrammatically at REF.2 in FIG. 3. The reference field REF does not only comprise the ordinal number n of the actual or the next video block $VB_n$, but also the sector number $SCTNR(VB_n)$ in which this video block starts. Since all sectors have equal lengths and since 75 of them can be read every second, the sector of a specific number can be searched considerably more rapidly than a video block having a specific ordinal number.

A third possibility is shown at REF.3 in FIG. 3. Here, the reference field does not only comprise the sector number $SCTNR(VB_n)$ and the ordinal number n, but also the sector number $SCT(VB_{n+1})$ of the next video block. The central processor unit 5 may be adapted in such a way that it computes the ordinal number n+1 of the next video block and the CD drive unit moves the read apparatus to the specific sector in which it searches the beginning of the video block having the computed ordinal number.

In view of the large number of sectors and the large number of video blocks which may be present on the disc, the possibilities shown at REF.1, REF.2 and REF.3 will comprise many bits. The reference field REF therefore preferably comprises a time code TC which indicates with respect to a specific reference instant (for example, the start of the sequence) when the corresponding picture must be displayed. As is shown at REF.4 in FIG. 3, this time code is preferably expressed in hours H, minutes M, seconds S, as well as a number n mod fr indicating the ordinal number of the picture in the Sth second. Here, fr denotes the frame frequency. The relationship between this time code and the sector number will be elucidated with reference to the following example. Let it be assumed that the following time code has been allocated to a video block which is read at the instant $t_o$ (see FIG. 1C) of the disc:

H=00
M=00
S=03
n mod fr=10

If the rotational speed of the disc is such that 75 sectors pass the read apparatus 1 every second, a determinable number of sectors has passed the read apparatus at the instant when the relevant picture is displayed. In fact, 3*75=225 sectors pass in the S=3 seconds. Starting from a frame frequency fr of 25 Hz, 10 pictures correspond to 10/25 seconds, i.e. 75*10/25= 30 sectors. In other words, a total number of 225+30=255 sectors has passed the read apparatus as from the reference instant. If this picture is frozen, the disc will continue to rotate and the read apparatus will continue to follow the track. To be able to resume normal display of the picture sequence, the central processor unit 5 may be programmed so as to drive the read apparatus 1 in such a way that it searches that video block on the disc whose time code corresponds to the time code of the freeze.

Since the video blocks have different lengths and a specific period of time is required to decode the picture information in a video block, there is usually no unambiguous correlation between the instant when a picture is displayed and the instant when the corresponding video block of the disc is read. For example, it may occur that the corresponding picture of a video block read at an instant $t_1$ (see FIG. 2C) of the disc is not displayed until an instant $t_2$. Thus, this time code does not indicate at all where the relevant video block on the disc can be found. This video block can only be found by comparing the time codes of all video blocks located in the vicinity of the sector (255) to which the time code of the actual picture corresponds. Such a search procedure is usually very slow. It is therefore advantageous to incorporate a pointer code PC in addition to this time code TC in the reference field, which pointer code provides an indication about the location where the beginning of the video block corresponding to the picture to be displayed as the first picture after the freeze can be found on the disc. As has already been noted, this pointer code can be used to indicate the freeze picture itself, but also to indicate the next picture in the picture sequence.

This pointer code may have many shapes, but preferably the shape shown at REF.5 in FIG. 3. It comprises a number SCTOFFST (sector offset) whose sign and magnitude represents a correction of the sector number corresponding to the time code TC, and a number WRDOFFST (word offset) indicating the ordinal number of the word in the sector with the corrected sector number representing the first SOF word of the desired video block. The following example will be given for the purpose of clarification. Let it be assumed that the time code TC is again equal to the time code in the above-given example and thus corresponds to sector number 255. Let it be assumed that SCTOFFST=−20 and WRDOFFST=16. The start of the next video block which must be read from the disc then corresponds to the sixteenth word in sector 255−20=235.

Figure 4:
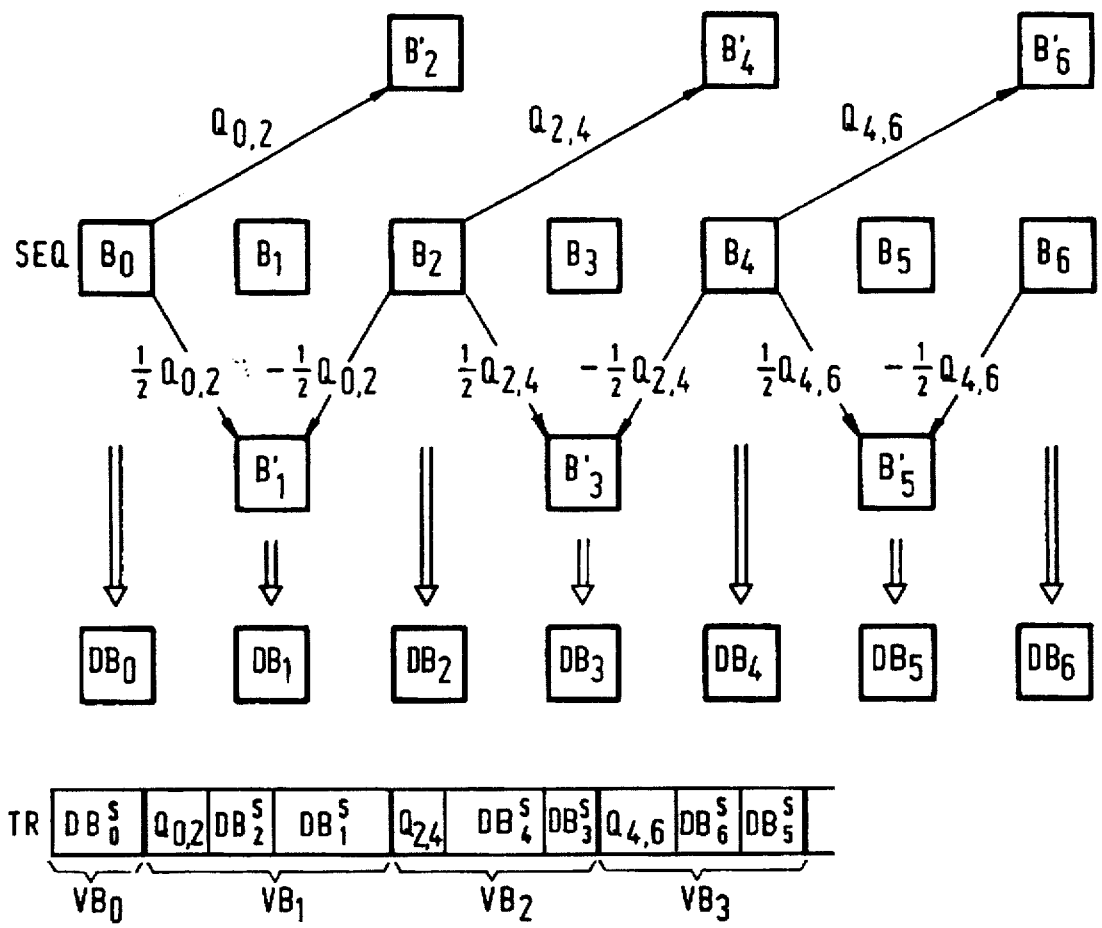
FIG. 4 shows diagrammatically an encoding method for full-motion video pictures and the composition of the video blocks which are transmitted.

It has been assumed in the foregoing that each picture $B_n$ is converted into one video block $VB_n$ by means of some encoding process. Such an encoding process may, however, be chosen to be such that a video block comprises video information of a number of consecutive pictures. A very advantageous encoding process is the so-called hierarchic encoding which will be further described with reference to FIG. 4. To this end the picture sequence of the pictures $B_0$, $B_1$, $B_2$, ... $B_6$ is again shown at SEQ in FIG. 4. This sequence is divided into a number of sub-sequences and an order is allocated to each sub-sequence. In the case considered here, the picture sequence is divided into two sub-sequences. The first sub-sequence, which will be referred to as zero-order sub-sequence, comprises the even-numbered pictures $B_{2m}$ (m=0, 1, 2, 3). The second sub-sequence, which will be referred to as first-order sub-sequence, comprises the odd-numbered pictures $B_{2m+i}$.

The picture $B_0$ is converted by means of intraframe encoding into an intraframe encoded picture $DB_0$ which comprises all information required to reconstruct the picture $B_0$ and which will therefore be referred to as sequence access block. The other pictures of the zero-order sub-sequence are subjected to an interframe encoding. More particularly, a system of motion vectors $Q_{2m,2(m+1)}$ is determined in this example for each picture of this zero-order sub-sequence. Each vector of this system describes the direction and the distance along which a pixel or a group of pixels of the picture $B_{2m}$ must be displaced so as to reach (approximately) the location occupied by this pixel or group of pixels in the picture $B_{2(m+1)}$. Starting from the picture $B_{2m}$ a prediction picture $B'_{2(m+1)}$ is computed for the picture $B_{2(m+1)}$ by means of this system of motion vectors $Q_{2m,2(m+1)}$. A zero-order difference picture $DB_{2(m+1)}$ is obtained by difference production of $B_{2(m+1)}$ and $B'_{2(m+1)}$.

The pictures of the first-order sub-sequence $B_{2m+1}$ are also subjected to an interframe encoding. More particularly, the pictures of the zero-order sub-sequence and the previously computed systems of motion vectors $Q_{2m,2(m+1)}$ are used in this example. The motion will herein be assumed to be linear. This means that the displacement of a pixel or a group of pixels in the picture $B_{2m+1}$ with respect to the location in the previous picture $B_{2m}$ used as a reference is half the displacement of this pixel or this group of pixels in the next picture $B_{2(m+1)}$ with respect to said reference location. The following procedure is carried out for the interframe encoding of the pictures $B_{2m+1}$ of this first-order sub-sequence. Starting from the previous picture $B_{2m}$ and a system of motion vectors $\frac{1}{2}Q_{2m,2(m+1)}$ each having the same direction as the motion vectors of the system $Q_{2m,2(m+1)}$ but being half as long, a first prediction picture is determined. Starting from the picture $B_{2(m+1)}$ and a system of motion vectors $-\frac{1}{2}Q_{2m,2(m+1)}$ each having a direction which is opposed to the direction of the motion vectors of the system $Q_{2m,2(m+1)}$ and being only half as long, a second prediction picture is determined. First and second prediction pictures are subsequently added together and the sum picture thus obtained is divided by two. The result is a prediction picture $B'_{2m+1}$. The first-order difference picture $DB_{2m+1}$ is obtained by difference production with the original picture $B_{2m+1}$. These difference pictures are converted into serial data blocks $DB^S_0$, $DB^S_1$, ... $DB^S_6$ by means of quantization and further encoding. Since a system of motion vectors is associated each time with two consecutive pictures, two serial data blocks together with the associated motion vectors are composed to one video block $VB_n$ (n=0, 1, 2, ... ). The sequence in which the data blocks and motion vectors can be transmitted is shown at TR in FIG. 4.

We claim:

1. An optically readable disc on which a sequence of pictures of a full-motion video scene is stored in the form of a series of video blocks, characterized in that said video blocks have unpredictably differing respective lengths, each block including the entire encoded picture information for at least one picture of said sequence, and each video block includes a header comprising reference information referring to the location of a predetermined video block in the series of video blocks.

2. A disc as claimed in claim 1, characterized in that said reference information comprises the ordinal number of the relevant video block in the series.

3. A disc as claimed in claim 1, characterized in that the reference information in the header of a given video block refers to the location of the next video block in the series.

4. A disc as claimed in claim 1, characterized in that said reference information comprises a time code which, with reference to a reference instant, is indicative of the instant when the picture characterized by the relevant video block is displayed in the case of normal display of the picture sequence.

5. A disc as claimed in claim 4, wherein said time code comprises a time indication in hours, minutes and seconds, and an auxiliary ordinal number indicating the ordinal number of a video block in a series of video blocks whose corresponding pictures must be displayed at a frame frequency within the period of a predetermined second.

6. A disc as claimed in claim 4, in which the series of video blocks is divided into sectors each having a sector number, and wherein the reference information further comprises a pointer code (PC) comprising a sector offset code which, together with the time code, points at the sector number indicating the beginning of the relevant video block.

7. A disc as claimed in claim 6, wherein the pointer code further comprises a word offset code indicating the ordinal number of the word in the relevant sector where the video block begins.

8. A disc as claimed in claim 1, in which the series of video blocks is divided into sectors each having a sector number, and wherein the reference information further comprises a pointer code (PC) comprising a sector offset code which, together with the time code, points at the sector number indicating the beginning of the relevant video block.

9. A disc as claimed in claim 8, wherein the pointer code further comprises a word offset code indicating the ordinal number of the word in the relevant sector where the video block begins.

* * * * *